United States Patent [19]

Greenblatt

[11] Patent Number: 4,779,191

[45] Date of Patent: Oct. 18, 1988

[54] METHOD AND APPARATUS FOR EXPANDING THE ADDRESS SPACE OF COMPUTERS

[75] Inventor: Richard Greenblatt, Cambridge, Mass.

[73] Assignee: Gigamos Systems, Inc., Lowell, Mass.

[21] Appl. No.: 722,837

[22] Filed: Apr. 12, 1985

[51] Int. Cl.$^4$ ............................................. G06F 12/00
[52] U.S. Cl. ...................................................... 364/200
[58] Field of Search ... 364/200 MS File, 900 MS File, 364/300

[56] References Cited

U.S. PATENT DOCUMENTS

| | | | |
|---|---|---|---|
| 3,786,436 | 1/1974 | Zelinski | 364/200 |
| 3,976,978 | 8/1976 | Patterson et al. | 364/200 |
| 4,286,321 | 8/1981 | Baker et al. | 364/200 |
| 4,374,410 | 2/1983 | Sakai et al. | 364/200 |
| 4,602,330 | 7/1986 | Ikeya | 364/200 |

OTHER PUBLICATIONS

*Computer*, "Memory Extension Techniques for Minicomputers", by Poppendieck and Desautels, pp. 68–75, 5/77.

*Primary Examiner*—Gary V. Harkcom
*Assistant Examiner*—Lawrence E. Anderson
*Attorney, Agent, or Firm*—Blakely, Sokoloff, Taylor & Zafman

[57] ABSTRACT

An address space, referred to herein as Moby space, may be defined having an address range greatly exceeding the direct addressing range of a particular computer, whereby each address in Moby space may be unique. Ranges of Moby space are swapped into and out of local memory space of the computer in question by processes referred to as reconciliation and dereconciliation. These processes are accomplished by maintaining in the computer, data structures which associate, typically on a per page or per section (multiple page) basis, each local page or section with its current Moby page or section. In addition to this address association and conversion, information being swapped must be scanned to separate the pointers from data and to appropriately convert pointers, but not data, as required during the swap. Achievement of aspects of the reconciliation and dereconciliation in separate hardware, particularly the maintenance of a running count of pointers to each page or section in local memory to identify which pages or sections may safely be swapped out, relieves the main processor of much of the overhead associated with these processes.

8 Claims, 4 Drawing Sheets

# METHOD AND APPARATUS FOR EXPANDING THE ADDRESS SPACE OF COMPUTERS

BACKGROUND OF THE INVENTION

1. Field of the Invention.

The present invention relates to the field of computer and computer memory systems.

2. Prior Art.

One of the most important characteristics of a computer system is its address space, as this basically determines how large a program can be run. Until now, the address space has generally been thought of as a hardware determined parameter dependent upon the width of one or more hardware data paths. By way of example, if a particular machine has an address bus n bits wide, or is capable of directly handling pointers n bits wide, then the address space of the machine will be $2^n$. This does not necessarily mean that the machine has memory installed of $2^n$ words, but rather that the machine is capable of addressing $2^n$ unique address locations, whether in local memory, on disk or elsewhere. By way of a more specific example, the Lambda processor manufactured by LISP Machine Inc. of Los Angeles has been said to have an address space of two to the 25 of 32 bit words, this number being determined by the width of certain hardware data paths, the size of certain mapping memories, etc. Although there have been various attempts to run larger programs than the basic address space of the computer involved, they have usually been of limited success.

One approach to a similar problem is to use some form of one of the virtual memory systems which are common place in current day computer systems. Virtual memory systems evolved in response to a need to run larger programs than allowable with the available amount of physical primary memory, generically referred to as core memory. With a virtual memory system, a large amount of core memory can be simulated by the combination of a smaller amount of core memory plus a large backing store, usually a disk system. The disk need not possess truly random access capability, and typically will have a cost per bit several orders of magnitude less than core memory. Basically, the image to be run is maintained on the disk, with the parts that are actually active, being swapped into core. The amount of core available affects only the number of swaps, and thus the time, necessary to run a given program. The ultimate answer will always be the same as if the entire amount of physical core had existed (ignoring of course any time dependencies, etc.).

A virtual memory system then, decouples the virtual address space from the physical address space. However, virtual addresses are still dealt with directly by hardware, and thus their sizes are limited by the width of certain hardware data paths. In the usual virtual memory system, the data on disk is maintained in exactly the same format as the format in which it is used in core. Thus swapping operations consist merely of transferring data from core to disk and vice versa. Accordingly, the ultimate limit is still a hardware determined parameter and thus, in many cases, undesirably small.

BRIEF SUMMARY OF THE INVENTION

Methods and apparatus for expanding the address space of computers are disclosed. In accordance with the method, an address space, referred to herein as Moby space, may be defined having an address range greatly exceeding the direct addressing range of a particular computer, whereby each address in Moby space may be unique. Data can then exist in two corresponding forms, the Moby format when resident in Moby space, and the local format when resident in local space. The process of conversion of data from Moby form to local form is called reconciliation, and that in the reverse direction is called dereconciliation. These processes are accomplished by maintaining in the computer, data structures which associate, typically on a per page or per section (multiple page) basis, each local page or section with its current Moby page or section. As part of this address association and conversion, information being reconciled or dereconciled must be scanned to separate the pointers from data and to appropriately convert pointers, but not data, as required. Achievement of aspects of the reconciliation and dereconciliation in separate hardware, particularly the maintenance of a running count of pointers to each page or section in local memory to identify which pages or sections may safely be safely dereconciled, relieves the main processor of much of the overhead associated with these processes.

DETAILED DESCRIPTION OF THE INVENTION

Figure 1:
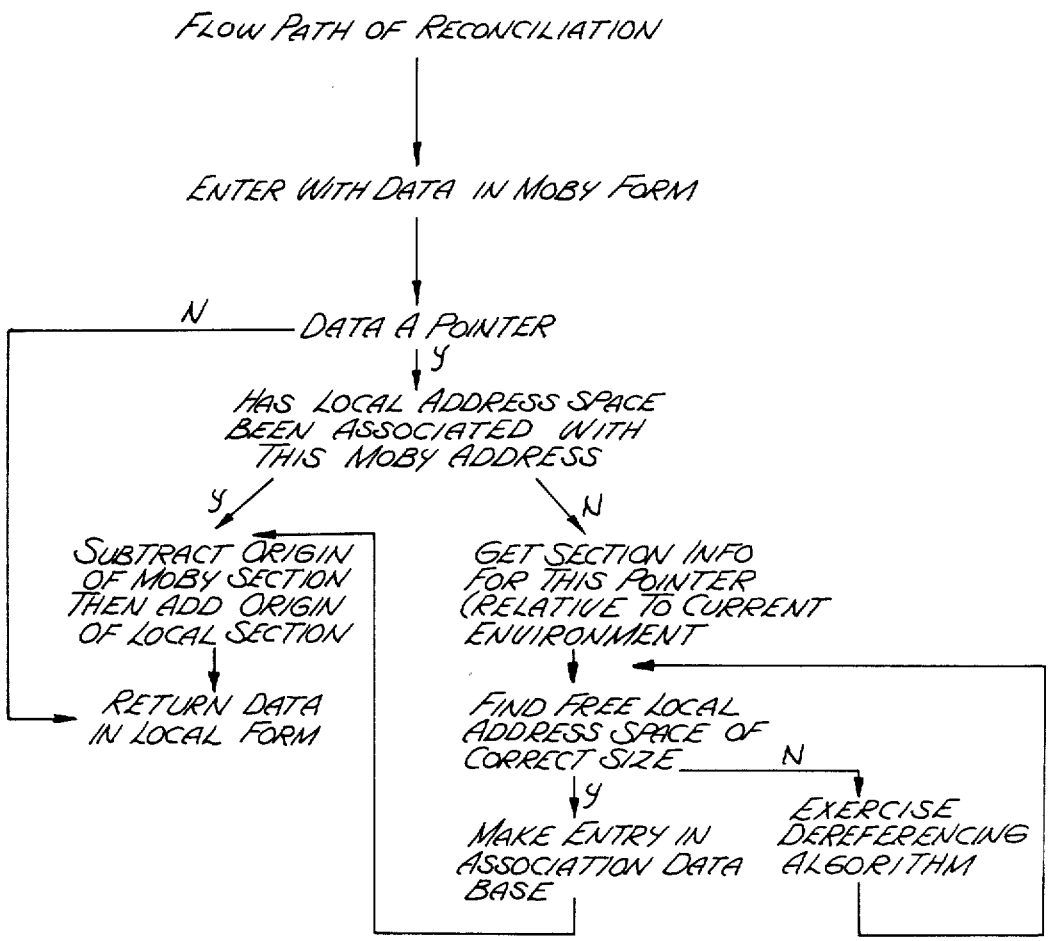
FIG. 1 is a logic flow diagram for the reconciliation of a single data point.

The preferred embodiment of the present invention is intended to operate with the Lambda processor hereinbefore referred to, and accordingly that processor will be used herein to provide better specificity to the description of a preferred embodiment of the invention. That processor utilizes a 32 bit word, two bits of which are dedicated to a CDR code and five bits of which are used to indicate the data type, leaving 25 bits for the pointer. Thus the address space for this machine is $2^{25}$ of 32 bit words.

The concept of the present invention allows the logical address space, which the inventor refers to as Moby space, to be decoupled from the underlying hardware address space, generally referred to herein as the local space. Once this is achieved, only software considerations limit the size of the Moby space. By way of example, the embodiment considered herein provides 57 bits of address in the Moby space for the Lambda processor, hereinbefore limited to 25 bits. The feasibility of such large address spaces makes fundamental differences possible in the way addresses are treated. For example, with such a large address space, it becomes possible to make every address which ever existed or will exist running a LISP machine environment unique (for example, each time a machine was booted, it might be assigned a 25 bit chunk of address base, which would never again be reused). This in turn makes it possible to implement pointers from any LISP machine's environment directly to any other. This has far reaching consequences for the possibility of employing multiple processors on a single problem in an effective manner, and on the problem of stable storage, to name only two important practical problems currently encountered.

The Moby address system of the present invention has some similarity to virtual memory systems, though it has certain very key differences. A key difference in the Moby address system of the present invention is that the data format on disk (or other bulk storage) is not the same as the data format in core. In core (local memory), data with hardware determined pointer widths, etc., exist exactly as with the prior art Lambda processor. On disk however, the data storage form is different, and not a simple image of that used in core. For example, two 32 bit words on disk might be used to represent each 32 bit word which exists in core. This then would allow a large pointer width, if desired, specifically a pointer width of up to 32 bits larger.

The base line system presented here used with the usual Lambda processor storage conventions allows a total Moby address pointer width of 25 (the pointer width of one word) plus 32 (a second word) or 57 bits. Obviously, because of the different format in Moby space from that used in local space, a format conversion referred to as reconciliation is required during a swap-in, with the inverse conversion, referred to herein as dereconciliation, being required during a swap-out. During these format conversions, it is necessary to distinguish pointer data, which must be converted from a Moby address to a local address, from nonpointer data, such as numbers, strings and the like, which should not be altered. To implement reconciliation and dereconciliation efficiently, the system maintains data structures, which associate, perhaps on a per page basis, each local page with its current Moby page. Since there are many more Moby pages than local pages, each Moby—local association must be in some sense transitory. The association of course may also be done on some basis other than a page basis, such as on a section basis, wherein a section is larger than a page, typically some multiple number of pages.

Obviously a Moby address system to achieve the intended purpose must eventually provide for recycling of local addresses. By way of example, consider a program for the Lambda processor which scans through $2^{26}$ words. After $2^{25}$ words have been associated, all local addresses will have been associated with Moby addresses, and the process can go no further unless some local addresses are recycled or disassociated. Care must be taken in the recycling of a local address however, as one cannot recycle a local address page and use it to associate a different Moby page unless, and only if, there are no local pointers to that page in existence from the other pages in local memory. Local pointers on the page in questoon to that same page of course should not be counted.

One way to determine how many local pointers point to each local page without special hardware would be to make a count pass over the entire local data structure. In a typical practical system, this would result in a noticeable, but probably not intolerable, delay, particularly if the entire local data base is retained in physical core memory (in a scheme hereinafter considered, it might not be). A system with one million words of core might make the count in about one to five seconds, for example. Such a delay would be tolerable in many instances, though would be expected to cause problems in any real time system. With special hardware however, as disclosed hereinafter, these counts are maintained incrementally by hardware with essentially no system slow down.

For various reasons, if reconciliation is done in software, it may be advantageous to allow the reconciliation process to be incremental instead of requiring an entire Moby page to be reconciled to a local page immediately when it is associated. For instance, pointers to pages in Moby space which have not yet been associated with local space cannot be reconciled until the association is made, and need not be reconciled until it is clear that the pointer is to be used. To implement this on the Lambda processor or on other tagged machines, the individual Qs on the data items on the local page which have not yet been reconciled are filled in with DTP-UNRECONCILED data type. The DTP-UNRECONCILED pointers are never allowed to be acted upon as part of the program. In particular, when an attempt is made to bring a DTP-UNRECONCILED pointer into the processor, an immediate trap occurs, and that pointer is reconciled before further computation can proceed. DTP-UNRECONCILED pointers can also be used in conjunction with dereconciliation in that any type Q in local memory can be changed to a DTP-UNRECONCILED pointer whenever desired. Of course, if the page involved is writeable and has been written, the corresponding Moby Q must be updated with the dereconciled local pointer. If any attempt is made to use a dereconciled pointer, a trap will occur causing it to be reconciled again before use.

When all available local space has been associated with Moby space, it is possible that no local pages with zero reference counts will exist to recycle. In such a situation, the system must dereconcile some local pointers and try again in the hope that the local reference count of some local page has been reduced to zero. In a local address space of $2^{25}$, there are $2^{17}$ pages (each of $2^8$ words) If all have a non zero pointer count, there must be at least $2^{17}$ pointers to them which would occupy at least $2^9$ pages (again, each being $2^8$ words) Therefore, in the extreme worst case, operating blindly, it might be necessary to dereconcile almost everything except $2^9$ pages worth before the local reference count of any page was reduced to zero. However, typical cases are expected to be far, far better than this worst case situation.

The foregoing worst case situation can be greatly improved by a selective dereconcile. After a count pass, if done in software, or at any desired time if the incremental count hardware hereinafter disclosed is used, one can construct have a histogram of the per page reference count data. N free local pages can then be obtained in one dereconcile sweep of the local data structure as follows: Set a threshold by consulting the cumulative page reference data from the histogram. During the sweep, any reference to a page with fewer references to it than this threshold would be dereconciled. No data would actually be dereconciled except pointers to the desired N pages however, so at the completion of the sweep, the system would retain $2^{17} - N$ pages of immediately usable local data. As shall subsequently seen, such a selective dereconcile can be done on an incremental basis using the count hardware subsequently described. In particular, a background processor (or process) can simply scan local space. As each pointer is passed, the pointer is dereconciled if it points to a local page with a suitably low reference count (with or without other conditions). If this reduces the local reference count of the page to zero, the page is put back on the available list. Prior to actually recycling a local page (which could result in that Moby address eventually getting swapped back in to a different local page), the state of the essential processor must be dumped out to assure that the reference counts are completely accurate. Note that the reference counts normally count only pointers contained in core memory, not those contained within the central registers of the processor or those in Moby space.

From the foregoing, it is apparent that a cache memory may have substantial advantages with the present invention wherein the memory is used to store a cache of recently processed pages in Moby form. This will make the data much more available for the incremental reconciliation and of course if the pages involved are writeable, will much more readily facilitate updating during the dereconciliation process.

Obviously one advantage of the Moby addressing scheme is that a plurality of processors may each have its "own" space and yet still have access to the space of any other machine, all by way of unique Moby addresses. In this case, when a Moby pointer is referenced, the storage being referenced might exist on any of the machines. Typically, one would provide various data bases and servers to aid in determining which machine was the "keeper" of the desired data. In the simplest form, there is one keeper of any given address, although in other schemes, for redundancy or other reasons, this may not be true. The keeper then, is the machine (possibly machines) which normally stores the given data on its disk. Such data can be checked out by other machines, each keeper maintaining a record of which machines has checked out what data of that keeper. The machine which checks out the data also keeps records of what data has been checked out from what machine. In the event a particular machine crashes, it may send out a wake-up message when it reboots to invoke recovery procedures, assisted in part by the records of the other machines, to assure global data base consistency.

The process of reconciling a large program which was kept on a remote server might involve excessive latency as messages are sent back and forth, etc., to effect the checkout and transfer. To improve the situation, one may transfer sections in bulk slightly ahead of the actual need of a particular machine. To optimize this process, one can provide an adaptive system to recognize various reference patterns and predict future references sufficiently in advance to allow completion of the transfer before required.

As previously pointed out, the basic pointer mechanism and the processes of reconciliation and dereconciliation work well in the case of several processors, each with its own local space working off the same Moby space. However, from an overall systems point of view, there is a problem of assuring consistency of the same Moby location as seen by several processors. The situation of course is different between read-only data and writeable data, as there is clearly no problem with read-only data. This points out the importance of identifying all read-only data as such to the system, as read-only data can be freely duplicated by each processor, not requiring the special mechanism described below for the case of read-write data.

With read-write data, the keeper must maintain a record of which other computers have or may have checked out the section, page or Q involved. Writeable data can be divided into four types, specifically (i) uniquely represented, (ii) automatically interlocked, (iii) manually interlocked and (iv) unsafe. Uniquely represented data is represented by a single current copy. While it can be safely modified by whatever processor properly possesses it, means must be provided for the normal keeper of the data to identify which processor, if any, has checked out the official copy. The processor that checks out the copy must be responsive to a disgorge message requesting that processor to either return the official copy to the keeper or to send the official copy to another processor. This disgorge operation is merely implemented by dereconciling the data in the local environment of the possessing processor to return it to the keeper or for dispatch to the requesting processor for reconciling into the local environment of that processor.

Automatically interlocked data is used where writes are possible, but rare. In this case the data may be duplicated as with read-only data and all using processors must maintain it in a read-only mode. If a write should occur, a fault will be taken whereafter the processor intending to make a change must exchange confirmation with all other processors that have checked out the data before a modification is allowed. In the case where two processors attempt to modify the data simultaneously, it is important only that all copies of the data get updated consistently, a condition readily achievable.

Manually interlocked data allows writes to proceed with minimal delay to the processor doing the write. In this case the data is set up read-only in the hardware. If a write happens, advisory messages may be sent to other processors having copies of the data. However, since the writing process is not delayed, it is possible that another machine could read the old data even well after the write has been complete and program execution proceeded. A primitive assure-Moby-consistency is provided however, which waits for advisory messages indicating that the write has been completed. After this returns, all reads done thereafter by any machine must see the new data.

For data referred to as unsafe data, the problem is ignored. Any processor having a copy of the data checked out which may have modified the data may respond to a request for a copy of the data at any time. In this case, in the event more than one processor responded, but with different data, either copy may be used, or some method of determining the best copy to use may be provided.

One might also define write once address space wherein data may be written thereto once, or in a LISP system that can be CONSed in, but never thereafter modified. This provides a valuable resource for dealing with data bases which are built by multiple processors simultaneously without excessive locking delays. Obviously because of the relatively huge size of Moby space, a very large address space within Moby space may be set aside for this purpose without normally significantly diminishing the amount of Moby space available for other purposes.

The uniqueness of the Moby addresses within the entire Moby space allows many simple operations to be efficiently performed in the keeper, either directly on the Moby data base or by localizing it. By way of example, a request to do a LISP GET can be sent across an ethernet as three Moby addresses, an operation and two arguments, with the reply being a single Moby address.

In the previous description, the processes of reconciliation and dereconciliation have been primarily referred to as processes associated with the swapping in and swapping out of pages of Moby space with respect to a local processor. For various reasons about to be described, it may be desirable to affect these swaps on some other unit basis. For this purpose a section is defined as a group of Moby pages which occupy one or more contiguous ranges of Moby address space, typically only a few such ranges if more than one. Generally speaking, if the number of ranges became excessive, the section would probably be recopied and compacted into a smaller number of ranges to avoid excessive fragmentation. Sections serve a roll in reducing data bases necessary to affect reconciliation and dereconciliation, and probably more importantly, provide a mechanism to control the globality of the Moby address space. For example, it would not be appropriate to have every process in the universe sharing a single copy of the LISP atom NIL, as serious problems obviously arise if the atom gets clobbered. Similarly, if a machine crashes at an arbitrary time, assuring that the global data base is again consistent is not a trivial problem. Sections however, provide a mechanism for beginning to deal with such problems. By way of example, sections can have a copy on write attribute wherein each processor can map in and use the base section, but if any write operation occurs, the primary copy is not modified. Instead, a mapped section arises, to be distinguished from the original section which is called the direct section, the mapped section consisting of new copies of any pages that have been modified plus the original pages where they have not been modified. The mapped section continues to occupy the same Moby address base as the original, or additional space if it has grown larger. To keep track of these copies the concept of environments is introduced. In brief, the current environment specifies which copy of each known section is actually in use at a given time by a given processor plus information which controls the selection of active copies of other sections which may become known. A section has a human sensible name and can appear in directories, be deleted, etc. In this way a section is somewhat similar to a conventional file, and also has some similarity to LISP machine areas in that a CONS operation in Moby space occurs with respect to a section.

Using sections, the operations of reconciliation and dereconciliation can be considered in two phases. First, there is the section level associate operation which assigns an appropriately sized chunk of local address space to the Moby address space of the particular section. Individual pages are then processed in either direction (reconciled or dereconciled) as called for. By making associate entries at the section level in the reconciliation data base, its size is greatly reduced. However page and Q entries under the section entry are still provided in some circumstances.

Using section based local-Moby associations implies that the reference counts mentioned above might really be kept on a section basis rather than the per page basis previously described. Similarly the smart dereconcile hereinbefore discussed may be used on the basis of sections. The system identifies a set of sections to be purged from local space on the basis of the reference counts, preferably incrementally maintained by the special hardware hereinbefore described. Once a decision is made to deassociate some particular set of sections, a scan of the local data base would be initiated. Any pointer to a section to be deassociated would be dereconciled. Once the local reference count of a given section had been reduced to zero, the deassociation can safely take place. Note that this deassociation process is well suited to being performed by a dedicated auxiliary processor so as to avoid interference with the main processor, though of course it could also be done by a background process on the main processor, if desired.

There are certain advantages of doing the associations and deassociations on a section basis rather than a page basis. Structures in Moby space which overlap page boundaries must be treated contiguously in local space, which could introduce complications. By establishing Moby local associations in larger units than single pages such as sections the problem is avoided since the structure would be contained entirely within its section. A section oriented system will involve much smaller Moby-local association data bases than a page oriented system.

The foregoing discussion of sections also illustrates how multiple versions of a section can exist at the same time and still all be linked in as desired by the multiple versions sharing the address space but not the data. If desired for certain uses, a dynamic reconciliation could be used wherein the local pointer corresponding to a Moby address is produced by the result of a local function call. The data in Moby form then would consist of a function to call and arguments. This may be used for linking LISP symbols for instance, though there are other options for doing this as well.

The foregoing discussion of the Moby address system, its organization, characteristics and uses has been presented in a "pure" form wherein every local address is always necessarily associated with a Moby address from which it has been swapped in. It is also possible to have an impure Moby address system such as one incrementally appended to an existing virtual address space image. Such systems are of great practical interest such as in the case of an existing LISP machine software environment which is to be booted as usual, then asked to join the Moby environment.

Having now described the concepts, characteristics, operation and advantages of the Moby address scheme of the present invention, specific implementations thereof will now be described. First referring to FIG. 1, a logic flow diagram for the reconciliation of a single item or Q may be seen. The starting point is the data in Moby form that is desired to be converted to local form. The first test on the data is to determine whether the data is or contains a pointer. On a machine of a tagged architecture, the determination may be made by a test of the data type subfield of the data. On a nontagged machine, typically the data would be organized with pointers only on certain pages and nonpointer data only on certain other pages. Accordingly, on a nontagged machine, the determination of whether the data is a pointer is made by knowledge of the conventional character of the relevant page from which the pointer came. Of course, if the data is determined not to be or contain a pointer or address, it is not changed, and returned directly in local form.

If the data is a pointer, the next step is to determine whether local address space has been associated with this particular Moby address. In the most frequent case, the answer will be yes since as hereinbefore described such associations are normally done on a page or section basis. Consequently, in the usual case one need only subtract the origin of the Moby page or section and then add the origin of the local page or section to the pointer to obtain the data in local form.

If local address space has not been associated with the Moby address, one must get the section information for the section containing this pointer, relative of course to the current environment, and then find free local address space of the correct size for the section. If there isn't any free local address space of the correct size, one or more sections currently associated must be selected for deassociation. Thus if free local address space cannot be found, the dereconciling algorithm must be executed to locate the best section or sections for deassociation and to carry out those operations to free up the required local address space. Once the local address space is located or otherwise made available, the association of the local address space with a Moby address space is made by an appropriate entry in the association data base, after which one merely needs to subtract the origin of the Moby section and add the origin of the local section to the pointer to return the data in local form. If incremental reconciliation is used, one may choose to not make the associations and not reconcile the data if the pointer is a Moby page to which no association currently exists.

Figure 2:
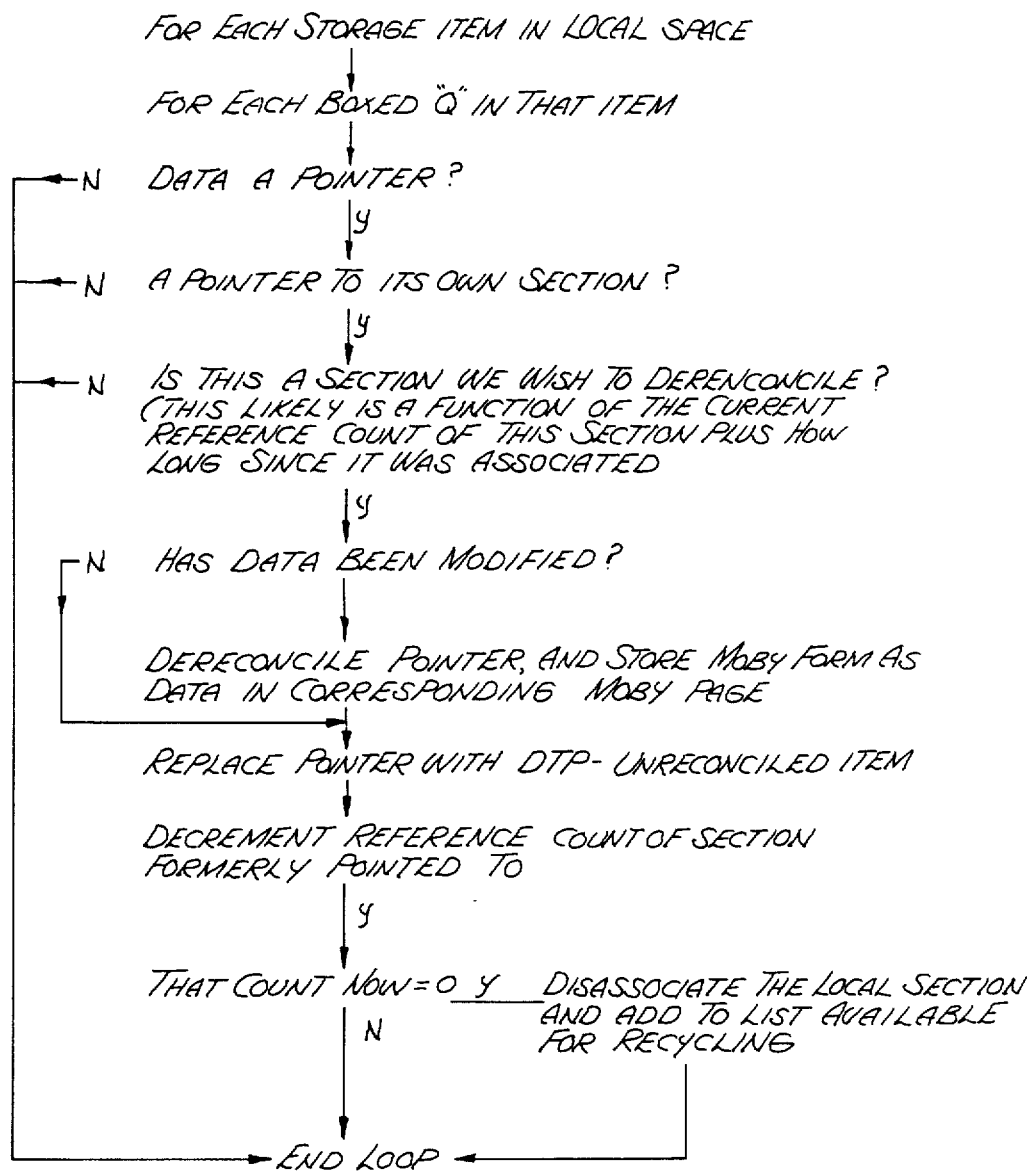
FIG. 2 is a logic flow diagram for the special hardware for dereferencing local addresses and including the dereconciliation of a pointer as necessary.

As previously described, it is preferable to dereference local addresses and dereconcile points as necessary by way of a separate processor so that the dereferencing and dereconciliation may occur simultaneously with processing by the main processor. Thus for this purpose, a typical logic flow diagram for the associated processor is shown in FIG. 2. In accordance with this diagram, each storage item in local space to be swapped out is examined, and for each boxed Q in that item a determination is made whether the data in that boxed Q is a pointer. If it is not, nothing further must be done for that boxed Q, as non pointer data may be swapped out directly. If the data is a pointer, a determination must first be made as to whether it is a pointer to its own section. If it is a pointer to its own section, it will not be counted. If on the other hand it is not a pointer to its own section, the next step is to determine if the section is one that is to be dereconciled. This determination will likely be a function of the current reference count of the section and perhaps how long since it was associated. If it is a section to be dereconciled, one would then determine whether the data had been modified. If it has, the pointer is dereconciled and stored in Moby form as data in the corresponding Moby page at an address determined from the local address by adding the origin of the Moby section and subtracting the origin of the local section. If it has not been modified, the pointer is merely replaced with a DTP-unreconciled item. This then allows the decrementing of the reference count of the section formerly pointed to by the now unreconciled pointer. If that reduces the count of the section formerly pointed to to zero, that local section may be placed on the list of available sections for recycling. If that count of course is not zero, the pointer has been dereconciled though dereconciliation of that single pointer has not in itself made additional sections available for recycling. In general, the step of dereconciling the pointer and storing the Moby form as data in the corresponding Moby page will be done in software in the main processor, as it is this processor which has general communication capabilities between local space and Moby space and the dereconciliation step itself is not time consuming, with the remainder of the steps in FIG. 2 preferably being accomplished by a special processor having access only to the main processor memory and accordingly, being a relatively inexpensive addition to the main processor.

Figure 3:
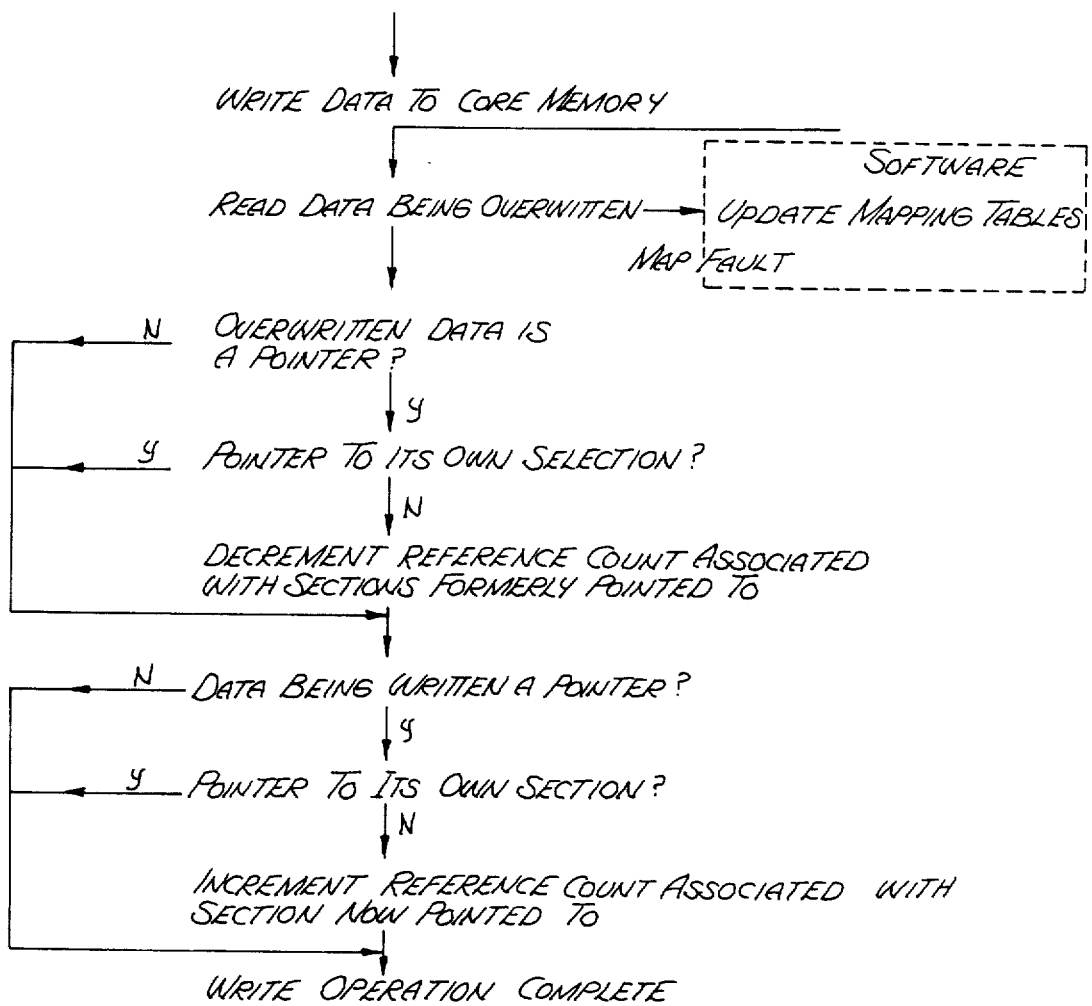
FIG. 3 is a logic flow diagram for the special hardware for the maintenance and updating of the section count.

FIG. 3 shows the flow diagram for a write to main memory invoking the special hardware to maintain the reference counts. First the data being overwritten is read, and its reference count decremented if appropriate. During this process, a map fault may be taken, in which case the mapping tables are updated and the reference tried again. If the data being overwritten is a pointer, and a pointer to a section other than its own, the reference count associated with the section formerly pointed to is decremented. It is not decremented however, if the data being overwritten is not a pointer, or alternatively, if it is a pointer to its own section. This essentially updates the count for the data point being overwritten. However, one needs to further update the count for the new data coming in also for the total count to remain correct. Thus the data being written is also examined to determine if it is a pointer and if so, if it is a pointer to its own section. If it is a pointer and a pointer not to its own section, the reference count associated with the section now being pointed to is incremented, thereby now properly accounting for the old data that was overwritten and the new data doing the overwriting as well.

Figure 4:
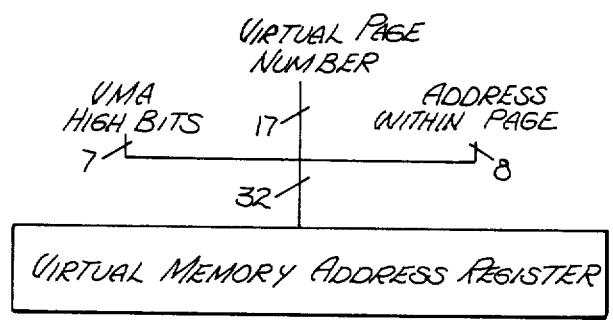
FIG. 4 is a block diagram of a typical prior art virtual memory address register and associated input address signals.
Figure 5:
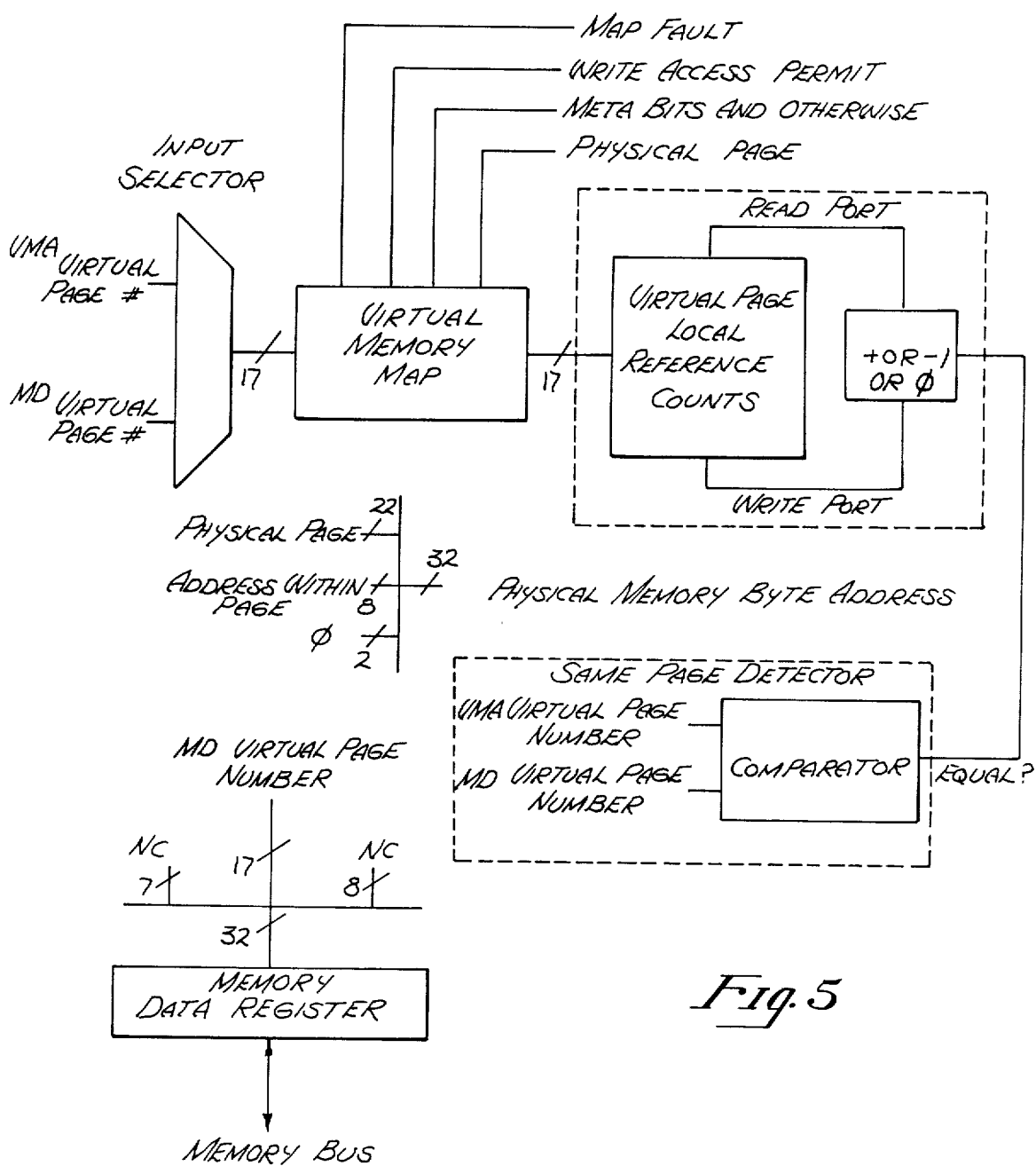
FIG. 5,is a block diagram showing the virtual memory translation unit of a prior art machine as modified to provide the maintenance of the reference counts on a page basis.

Now referring to FIG. 4, the block diagram of a virtual memory address register and the signals making up the input address for the virtual memory address register utilizing data path widths characteristic of the LMI Lambda processor may be seen. The VMA register is actually 32 bits wide, though the high order 7 bits are not used because of the 25 bit pointer limitation of the Lambda processor. The 25 bits actually used are comprised of the lowest order 8 bits representing the address within a particular page, with the other 17 of the 25 bits representing the virtual page number. The virtual memory address register is loaded with the desired virtual address whenever it is desired to make a read or write to the virtual memory system. FIG. 5 illustrates the virtual memory translation unit itself, and includes the additional hardware within the dashed lines which has been added to carry out the Moby address scheme. In particular, during the active portion of a memory cycle, the virtual memory map is driven by the VMA virtual page number via a two input selector. The virtual memory map has various outputs including a map fault which, if asserted, indicates the mapping information is invalid and a map reload cycle is necessary, the map reload cycle in the Lambda processor being executed by firmware. If the mapping information is valid and the cycle permission is OK (a write access permit must be asserted if this is a write cycle) then the physical address is developed from the physical page number combined with the VMA address within the page. This is sent to the memory system, and the desired data is transferred to or from the memory data register.

The Moby address scheme of the present invention adds to the virtual memory address system of the Lambda processor a memory containing virtual page local reference counts. This memory is driven from the same address lines as the virtual memory map. The memory is maintained incrementally so that every time a write cycle is done the count associated with the pointer, if any, being overwritten is decremented, and the count associated with the pointer being written, if any, is incremented. In either case, if the pointer being overwritten points to its own page, the decrementing is suppressed or alternatively, if the pointer being written points to its own page, the incrementing is suppressed. Obviously, while the foregoing illustrates the maintenance of the counts on a virtual page basis, the same may be readily maintained on a section basis. In that case the circuit would be modified by driving the local reference count memory not with the input of the virtual memory map but instead, with a section number output of the virtual memory map.

It was previously pointed out that the preferred embodiment of the present invention is used on a LISP processor having a tagged architecture, but that the present invention may readily be adapted for use with a machine of a nontagged architecture by separating data from pointers on a page basis. This form of data organization has been used before in many systems and is called the BIBOP (big bag of pages) scheme. In the BIBOP scheme, all data stored on a particular virtual memory page is of the same data type. To apply the Moby address page count hardware to a conventional nontagged machine such as the VAX manufactured by Digital Equipment Corporation of Maynard, Massachusetts, using the BIBOP scheme one would enable the incrementing or decrementing of the per page reference counts based on information coming from the memory mapping hardware which in turn would be set accordingly to whether the particular page contained pointer data or not.

Thus there has been described herein a new and unique method of grossly increasing the address space of a conventional computer together with certain hardware for carrying out the method in a highly efficient manner. However, while the apparatus and method have been disclosed herein with respect to certain preferred embodiments and with respect to use in conjunction with a specific prior art processor, it will be understood by those skilled in the art that various changes in form and detail may be made therein without departing from the spirit and scope thereof.

I claim:

1. A method of expanding the address space of a computer having a tagged architecture and having a limited local address space to allow the running of programs thereon larger than the storage capacity of the local address space comprising the steps of (a) providing a large data storage capacity occupying an extended address space substantially larger than the local address space and within which each address is unique and storing data in said large data storage capacity in a different format than data stored in said local address space, (b) storing a large program including pointers to other parts of the program in the extended address space as data, (c) associating a portion of the local address space, with a portion of the extended address space containing a portion of the large program to be run, by identifying as currently unused, at least one portion of the local address space containing a portion of the large program being run to which no other program portion in other portions of the local address space points, and deassociating that portion of the local address space from all addresses of the extended address space;

(d) transferring and reconciling at least part of the program portion stored in the portion of the extended address space associated in step (c) into the associated portion of local address space, at least as the program portion is needed during program execution, the reconciling being done by locating unreconciled pointers therein, tagged as unreconciled data type before being used a part of the running program, and reconciling the pointers to program portions currently having associated local and extended address space portions by changing the data type tag of pointers to other parts of the program portion being reconciled to a reconciled data type, and by subtracting from pointers to other program portions currently associated, the origin of the extended address portion from which the program portion being pointed to came, and adding thereto the origin of the local address portion in which the program portion being reconciled currently resides, and changing the data type tag thereof to a reconciled data type, (e) dereconciling the program portion identified as currently unused in step (c) by changing the data type of pointers to other parts of the program portion being dereconciled to a dereconciled data type, and by adding to pointers to other program portions currently associated, the origin of the extended address portion from which the program portion being pointed to came, and subtracting therefrom the origin of the local address portion in which the program portion being dereconciled currently resides, and changing the data type tag thereof to a dereconciled data type, and (f) transferring the program portion dereconciled in step (e) from the respective portion of the local address space into the associated portion of the extended address space prior to deassociating the respective portion of the local and extended address spaces, (g) for data containing pointers to program portions currently not having associaated and extended address portions, and before such data is used as part of the running program, repeating steps (c) and (d) for each of the last named program portions, (h) repeating step (g) to continue execution of the program.

2. The method of claim 1 wherein the steps of claim step (e) and (f) are carried out only if the data of the respective program portion had been modified after being reconciled.

3. The method of claim 2 further comprising, in instances when a currently unused portion of the local address space cannot be identified in the steps of step (c) selecting portions of the local address space associated with a respective portion of the extended address space and containing data tagged as reconciled data type, and dereconciling the data therein by adding to pointers to other program portions currently associated, the origin of the extended address portion from which the program portion being pointed to came, and subtracting therefrom the origin of the local address portion in which the program portion being dereconciled currently resides, and changing the data type tag thereof to a dereconciled data type, at least until one portion of the local address space may be identified in the step of step (c) as currently unused.

4. The method of claim 1 wherein the portions of the local and extended address spaces are individual pages.

5. The method of claim 1 further comprising, in instances when a currently unused portion of the local address space cannot be identified in the steps of step (c), selecting portions of the local address space associated with a respective portion of the extended address space and containing data tagged as reconciled data type, and dereconciling the data therein by adding to pointers to other progrmm portions currently associated, the origin of the extended address portion from which the program portion being pointed to came, and subtracting therefrom the origin of the local address portion in which the program portion being dereconciled currently resides, and changing the data type tag thereof to a dereconciled data type, at least until one portion of the local address space may be identified in the step (c) as currently unused.

6. The method of claim 5 wherein for each program portion associated with a portion of the local address space and transferred thereinto, a running reference count of pointers thereto from other program portions associated with other portions of the local address space transferred thereinto and reconciled is maintained by incrementing the reference count as each pointer thereto from another portion of the local address space is reconciled or a reconciled pointer is written and decrementing the reference count as each pointer thereto from another portion of the local address space is dereconciled or overwritten, a currently unused portion of the local address space being identified for purposes of the step of step (c) by a zero reference count.

7. The method of claim 6 wherein the portions of the local address space associated with a respective portion of the extended address space having the lowest running count are selected for the step of claim 5.

8. The method of claim 1 wherein the portions of the local and extended address spaces are sections each comprising a plurality of pages.

* * * * *